Nov. 11, 1958 — R. S. ZEBARTH — 2,859,471
POULTRY PICKER WITH UNIFORM LENGTH FINGERS
OF VARIABLE DIAMETERS
Filed Feb. 23, 1954 — 3 Sheets-Sheet 1
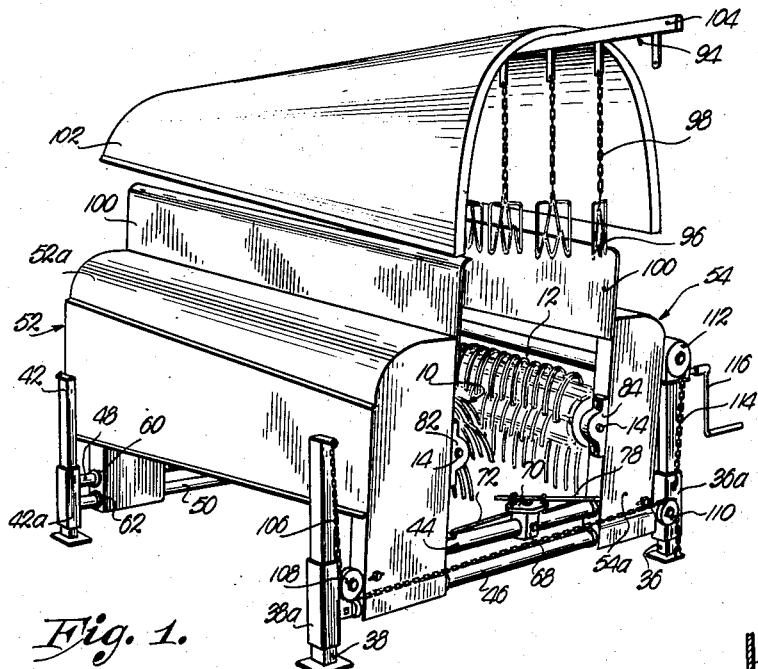
Fig. 1.
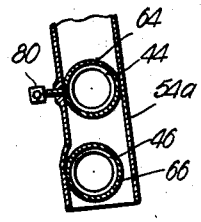
Fig. 5.
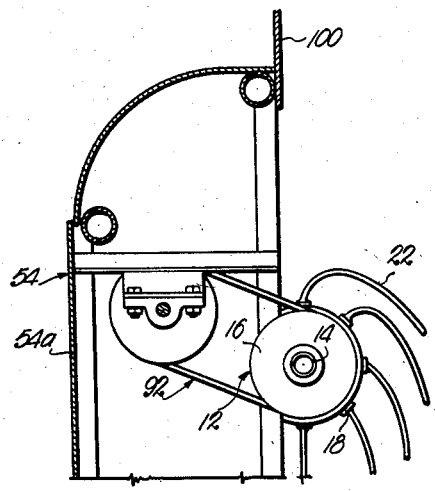
Fig. 4.
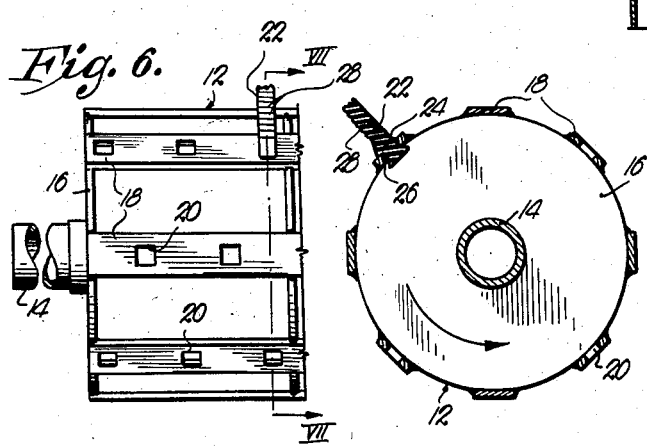
Fig. 6.
Fig. 7.
INVENTOR.
Ralph S. Zebarth
BY
ATTORNEY.

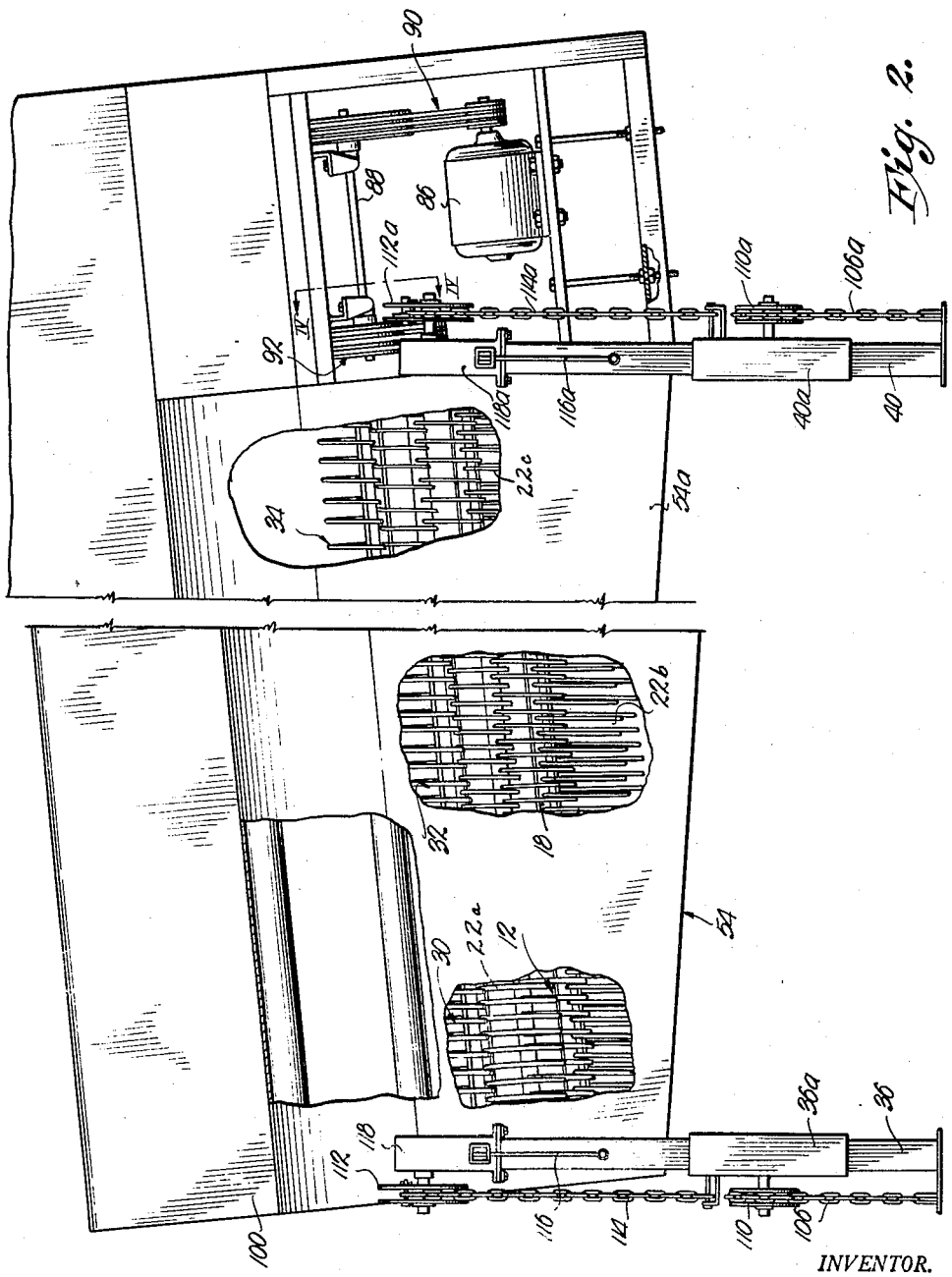

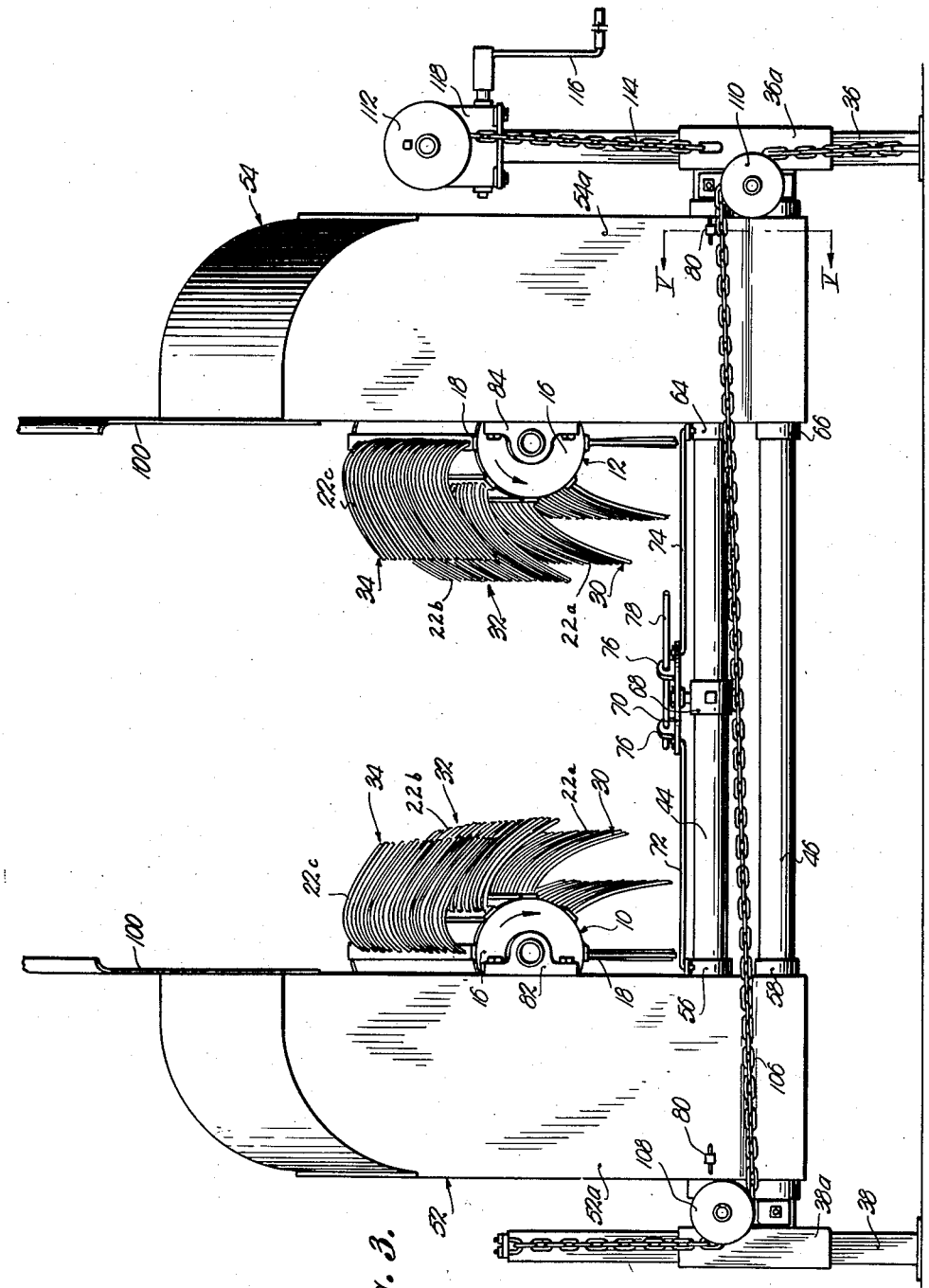

United States Patent Office 2,859,471
Patented Nov. 11, 1958

2,859,471

POULTRY PICKER WITH UNIFORM LENGTH FINGERS OF VARIABLE DIAMETERS

Ralph S. Zebarth, Hickman Mills, Mo., assignor to Gordon Johnson Equipment Company, Kansas City, Mo.

Application February 23, 1954, Serial No. 411,750

14 Claims. (Cl. 17—11.1)

This invention relates to the picking of feathers from poultry, and has for its primary object the provision of a machine for automatically removing the feathers as the birds are advanced horizontally therethrough as by utilization of an overhead conveyor from which the birds are suspended by means of chains and shackles.

It is the most important object of the present invention to provide a multiple picking machine that includes a pair of spaced, rotatable reels, each of which has a number of rows of elongated fingers, the fingers progressively decreasing in weight and/or diameter as one end of the reels is approached.

Another important object of the present invention is to provide a feather-picking machine wherein all of the fingers of both reels may be of the same length but wherein the reels are mounted on structure capable of shifting the reels toward and away from each other to vary the distance between the fingers that extend radially from the reels during rotation thereof.

A further object of this invention is to provide a feather-picking machine of the multiple type wherein the angularity of the reels may be varied to suit the desires of the operator and particularly to accommodate birds of differing sizes.

A still further object of the instant invention is to provide a method of picking poultry which includes subjecting particular areas of the fowl to the action of picking fingers so that relatively heavy fingers may be utilized for hard-to-remove feathers, whereas lighter fingers may be employed to remove feathers on other areas.

In the drawings:

Figure 1 is a front perspective view of poultry picking apparatus having specialized means for picking feathers from particular areas of fowl made pursuant to my present invention.

Fig. 2 is an enlarged, side fragmentary elevational view thereof, parts being broken away to reveal details of construction.

Fig. 3 is an enlarged, front end elevational view thereof.

Fig. 4 is a fragmentary, detailed, cross-sectional view taken on line IV—IV of Fig. 2.

Fig. 5 is an enlarged detailed, cross-sectional view taken on line V—V of Fig. 3.

Fig. 6 is an enlarged, fragmentary, side elevational view of one of the reels showing the mounting bars for the fingers and illustrating one of the fingers fragmentarily; and Fig. 7 is a cross-sectional view taken on line VII—VII of Fig. 6.

It is well known by those familiar with the field to which the present invention relates, that it is most difficult to remove feathers around the neck and hocks of the bird, whereas less force is required to remove the feathers from other parts. By virtue of this fact the present invention contemplates utilization of a pair of spaced-apart, rotatable reels, each of which is provided with a plurality of flexible fingers that wipe and slap against the bird as it is advanced through the machine.

The axes of rotation of the reels are inclined, to the end that, when the birds are suspended by the legs, the head, neck and lower parts of the wings are exposed to the action of one set of flexible fingers. As the bird progresses it is subjected to a second stage of feather removal wherein a second set of fingers of differing weight and/or diameter act upon the feathers of the body of the bird. Finally, as the birds are advanced through the machine, they are acted upon by still another group of rotating fingers.

As illustrated in Figs. 1 and 3 of the drawings the multiple feather-picking machine forming the subject matter of the present invention, contemplates the use of a pair of spaced, rotatable reels broadly designated by the numerals 10 and 12, and since the same may be identical in all respects, the details of construction of but one will hereinafter be set forth.

As shown best in Figs. 6 and 7 of the drawings, reels 10 and 12 each include an elongated shaft 14 upon which is rigidly mounted a plurality of spaced-apart, circular discs 16 for rotation therewith. The discs 16 are in turn interconnected by a number of elongated bars 18 extending longitudinally of the reels in spaced-apart relationship throughout the circumference of the discs 16. Each of the bars 18 is provided with a plurality of spaced, polygonal openings 20 staggered as shown in Fig. 6 for receiving elongated, flexible fingers 22. Each finger 22 is provided with an enlarged head 24 having a groove 26 therein. When the fingers 22 are inserted into the openings 20 and moved radially outwardly they snap into place as seen in Fig. 7. The leading face of each of the fingers 22 is roughened by the provision of a plurality of ribs 28 that act upon the feathers of the bird when the reels rotate in the direction of the arrows shown in Figs. 3 and 7.

The longitudinal axes of the shafts 14, i. e. the axes of rotation of the reels 10 and 12, are inclined as seen in Figs. 1 to 3 inclusive and, although the fingers 22 may all be of the same length, they progressively decrease in weight as one end of the reels 10 and 12 respectively is approached. To this end the fingers 22 of each reel 10 and 12 are sub-divided into three separate groups 30, 32 and 34 (see Fig. 2), the heaviest fingers 22a or those having the greatest diameter or thickness, being in group 30 and located at the lowermost ends of the reels 10 and 12. The lightest fingers 22c, namely, those having the smallest diameters or thicknesses, are contained in group 34 at the uppermost ends of the reels 10 and 12, and the fingers 22b forming the central group 32 are of medium weight, of less diameter or thickness than the fingers 22c of group 34.

By way of example, the fingers 22b of group 32 may be fifty percent (50%) heavier than the fingers 22c of group 34, and the fingers 22a of group 30 may be fifty percent (50%) heavier than those of group 32.

The reels 10 and 12 are operably supported for rotation on the longitudinal axes of the shafts 14 thereof and such supporting structure includes four standards 36, 38, 40 and 42 provided with nonrotatable, vertically reciprocable sleeves 36a, 38a, 40a and 42a.

The sleeves 36a and 38a are rigidly interconnected by a pair of spaced, elongated, parallel members 44 and 46 and the sleeves 40a and 42a are likewise joined by similar members 48 and 50. The four members 44, 46, 48 and 50 carry a pair of picking assemblies, broadly designated by the numerals 52 and 54 for movement toward and away from each other, the reel 10 being carried by the assembly 52 and the reel 12 being operably mounted on the assembly 54.

The assemblies 52 and 54 include hollow housings 52a and 54a respectively, each mounted on suitable framework as is clear in Fig. 4 of the drawings. The forwardmost and lowermost end of the housing 52a is rigidly secured to a pair of collars 56 and 58 slidable horizontally on members 44 and 46 respectively. The rearmost and highest end of the housing 52a is similarly supported by the members 48 and 50 through utilization of a pair of collars 60 and 62 shown in Fig. 1 of the drawings.

The housing 54a is similarly mounted on the members 44 and 46 by slidable collars 64 and 66 respectively, and although not illustrated in the drawings, the rearmost end of the housing 54 is mounted on the members 48 and 50 through use of collars similar to the collars 60 and 62.

Each of the members 44 and 48 is provided with manually operable structure for shifting the collars on the members which join the sleeves, to not only increase or decrease the distance between the reels 10 and 12, but to vary the relative angularity of the axes of rotation thereof. One of such structures, namely, that associated with the member 44, is illustrated in Figs. 1 and 3 of the drawings and includes a setscrew block 68 rigidly secured to the member 44 midway of the ends thereof carrying a plate 70 thereabove for rotation on a vertical axis. Rods 72 and 74 pivotally interconnect the plate 70 with the collars 56 and 64 respectively. Upstanding ears 76 on the plate 70 receive a rod 78 that is in turn utilized to rotate the plate 70 on its vertical axis and thereby exert a push-pull action to the rods 72 and 74 which in turn causes the collars 56 and 64 to reciprocate toward and away from each other on the member 44.

When the distance between the reels 10 and 12 has been determined, and the angularity between the axes of rotation thereof properly set, the assemblies 52 and 54 are held against relative movement toward or away from each other by tightening of setscrews 80 that engage the member 44 as illustrated in Fig. 5 of the drawings. Similar releasable clamping means may be provided to engage the member 48.

Bearings 82 and 84 on the assemblies 52 and 54 rotatably receive the shafts 14 of reels 10 and 12 respectively at the lowermost ends thereof, as shown in Figs. 1 and 3. Similiar bearings (not shown) are provided for the shafts 14 at the uppermost ends of the reels 10 and 12, disposing the shafts 14 and, therefore, substantially half of the reels 10 and 12 outside the housings 52a and 54a respectively. It may be desirable that reels 10 and 12 be driven separately, the drive for reel 12 contained within the housing 54a at the uppermost end thereof being illustrated in Figs. 2 and 4 of the drawings.

A prime mover, such as a variable speed electric motor 86, is operably coupled with an idler shaft 88 by belt and pulley means broadly designated by the numeral 90. Shaft 88, inclined in parallelism with the shaft 14 of reel 12, is in turn operably coupled with the reel 12 by belt and pulley means broadly designated by the numeral 92.

During operation of the machine it is to be preferred that the poultry be advanced therethrough between the reels 10 and 12 along a rectilinear, horizontal path of travel; and one means of so advancing the poultry is illustrated in Fig. 1 of the drawings. It includes an overhead conveyor, broadly designated by the numeral 94 from which is suspended a plurality of shackles 96 through the medium of flexible supports preferably in the nature of chains 98. In order to confine the removed feathers within the machine, the assemblies 52 and 54 are provided with upstanding shields 100 over which is disposed a hood 102 that may be separate from the shields 100 and suitably carried by overhead track 104 forming a part of the conveyor 94.

The assemblies 52 and 54 may be raised and lowered with respect to the hood 102 and the conveyor 94 and the angle of inclination of the reels 10 and 12 may be varied by reciprocating the sleeves 36a, 38a, 40a and 42a on their standards. The sleeves 36a and 38a are raised and lowered simultaneously and the operating structure therefor includes a chain 106 rigidly secured at one end thereof to the uppermost end of standard 38 whence it passes around a pulley 108 rotatably mounted on the sleeve 38a. The chain 106 extends across the front of the machine and around a second pulley 110 rotatably carried by the sleeve 36a. The opposite end of the chain 106 is rigidly secured to the standard 36 at its lowermost end.

Winch means including a drum 112 is mounted directly upon the uppermost end of the standard 36 and is operably connected with a chain 114 depending therefrom and attached directly to the sleeve 36a. An operating handle 116 for the drum 112 is coupled therewith through suitable gear reduction means 118.

Identical structure shown in part by Fig. 2, is provided for raising and lowering the opposite end of the machine and includes a chain 106a joined at one end thereof to the lowermost end of the standard 40, passing over a pulley 110a on the sleeve 40a, thence around another pulley (not shown) comparable to pulley 108 and mounted on the sleeve 42a and thence upwardly to a point of connection with the uppermost end of the standard 42. A second chain 114a interconnects sleeve 40a with a winch drum 112a, the latter of which is driven through gear reduction means 118a by a handle 116a.

The birds may be first suspended from the shackles 96 by their legs and directed through the picking machine, preferably but not necessarily, from the lowermost ends of the reels 10 and 12 to the uppermost ends thereof. When the motors 86 are energized to rotate the reels 10 and 12 in opposite directions, as shown by the arrows in Fig. 3 of the drawings, preferably at the same speed, all of the fingers 22 will extend radially outwardly from the axes of rotation of the reels by virtue of the flexibility of the fingers 22 and a combined downward slapping and wiping action will be imparted to the feathers to pull the same loose from the birds. Such pulling action is enhanced by the roughened condition of all of the fingers 22 by virtue of the provision of ribs 28 thereon.

As the birds are advanced substantially horizontally at a predetermined normally constant speed, the head, neck and lower parts of the wings will first be subjected to the action of the relatively heavy fingers 22a of the groups 30 thereof, and all of the feathers of the neck and lower parts of the wings will be removed. The birds then progress to a point between the fingers 22b of the median group 32 and these lighter fingers 22b will act upon the body of the bird to remove the feathers therefrom. Different parts of the poultry are successively subjected to the various groups of fingers by virtue of the fact that the birds move horizontally, whereas the axes of rotation of the reels 10 and 12 are inclined upwardly as the outlet end of the machine is approached.

After the feathers have been removed from the body of the bird by the fingers 22b within the median group 32, the uppermost portion of the body and the legs of the poultry are subjected to the action of the relatively lightweight fingers 22c contained in the groups 34 of the reels 10 and 12.

The birds are then reversed on shackles 96 to hang by their necks.

When the poultry is thereupon advanced through a second picking machine of the type hereinabove described, the hocks will be acted upon by the heavy fingers 22a of group 30.

Inasmuch as the preferred conveyor means 94 chosen for illustration is rigidly mounted so that the birds are always advanced along a horizontal line that is not adjustable as to height, it becomes necessary to raise and lower the reels 10 and 12 so that the fingers 22 will properly act upon the feathers thereof as above described for birds of various sizes. It is but necessary to manipulate the handles 116 and 116a to accomplish this purpose. During such adjustment the operator may assure himself that the various parts of the birds will be acted upon in succession as above outlined by varying the angles of slope of the reels 10 and 12 and it is for this reason that structure is provided to raise and lower each end of the machine independently of the other. It may be pointed out that a sufficiently loose fit is provided between the sleeves and the standards upon which the same are slidably mounted so as to permit variance of the slope of the reels 10 and 12 without unduly tipping the standards from their normally vertical positions.

Differences in sizes of poultry to be handled through use of the feather-picking machine of this invention requires variance of the distance between the reels 10 and 12 and this is accomplished by manipulation of the structure on members 44 and 48, one of which is shown in Figs. 1 and 3. After loosening of the fasteners 80 the rods 78 may be manipulated to move the assemblies 52 and 54 toward and away from each other and to vary the angularity therebetween.

The machine may be used with the axes of rotation of the reels 10 and 12 in parallelism or at any angle desired, and to this end, it is pointed out that the fit between the members 44, 46, 48 and 50, and the collars slidable thereon, is sufficiently loose to permit the distance between the assemblies 52 and 54 at one end thereof to be greater than the distance therebetween at their opposite ends.

Many factors are dependent upon the nature and size of the bird being de-feathered. This may well determine the distance between the reels and their relative angularity. For best results however, some overlapping of the fingers should be provided at both ends of the machine when adjusting the assemblies 52 and 54 toward and away from each other.

The speed of advance of the poultry, their distances apart and the sizes of the birds determines also the speed of rotation of the reels. Height is dependent on the length of the poultry and which part of the feathered areas are to be subjected to particular fingers. In a line operating at 1500 birds an hour, reel speeds of approximately 345 R. P. M. have been satisfactory for most picking conditions.

Having thus described the invention, what is claimed as new and desired to be secured by Letters Patent is:

1. In a fully automatic, multiple action machine for sequentially subjecting the various parts of a bird to a series of progressively changing modes of treatment in continuous, uninterrupted succession commensurate with varying degrees of resistance of the feathers thereof to picking, while the bird is advanced constantly along a predetermined path of travel, said machine comprising a pair of elongated reels, spaced apart to receive the bird therebetween, and rotatable continuously about their longitudinal axes; a plurality of outwardly-extending, flexible fingers mounted on each reel respectively throughout the length thereof and spaced circumferentially therearound, the fingers being relatively heavy at one end of the reels, becoming gradually and progressively lighter as the opposite end of the reels is approached whereby the picking action thereof uniformly varies in step-by-step fashion and with decreasing force as said opposite end of the reels is approached; and means mounting the reels with said axes thereof disposed at an angle to said path of travel of the bird whereby picking commences at one end of the bird as it enters between the reels and proceeds gradually and progressively to the opposite end of the bird as it advances along the reels.

2. In a fully automatic, multiple action machine for sequentially subjecting the various parts of a bird to a series of progressively changing modes of treatment in continuous, uninterrupted succession commensurate with varying degrees of resistance of the feathers thereof to picking, while the bird is advanced constantly along a predetermined path of travel, said machine comprising a pair of elongated reels, spaced apart to receive the bird therebetween, and rotatable continuously about their longitudinal axes; a plurality of outwardly-extending, flexible fingers of equal lengths mounted on each reel respectively throughout the length thereof and spaced circumferentially therearound, the fingers being relatively heavy at one end of the reels, becoming gradually and progressively lighter as the opposite end of the reels is approached whereby the picking action thereof uniformly varies in step-by-step fashion and with decreasing force as said opposite end of the reels is approached; and means mounting the reels with said axes thereof disposed at an angle to said path of travel of the bird whereby picking commences at one end of the bird as it enters between the reels and proceeds gradually and progressively to the opposite end of the bird as it advances along the reels.

3. In a fully automatic, multiple action machine for sequentially subjecting the various parts of a bird to a series of progressively changing modes of treatment in continuous, uninterrupted succession commensurate with varying degrees of resistance of the feathers thereof to picking, while the bird is advanced constantly along a predetermined path of travel, said machine comprising a pair of elongated reels, spaced apart to receive the bird therebetween, and rotatable continuously about their longitudinal axes; a plurality of outwardly-extending, flexible fingers mounted on each reel respectively throughout the length thereof and spaced circumferentially therearound, the fingers being relatively heavy at one end of the reels, becoming gradually and progressively lighter as the opposite end of the reels is approached whereby the picking action thereof uniformly varies in step-by-step fashion and with decreasing force as said opposite end of the reels is approached; means mounting the reels with said axes thereof disposed at an angle to said path of travel of the bird whereby picking commences at one end of the bird as it enters between the reels and proceeds gradually and progressively to the opposite end of the bird as it advances along the reels; and means for varying the angularity between said axes and said path of travel of the bird.

4. In a fully automatic, multiple action machine for sequentially subjecting the various parts of a bird to a series of progressively changing modes of treatment in continuous, uninterrupted succession commensurate with varying degrees of resistance of the feathers thereof to picking, while the bird is advanced constantly along a predetermined path of travel, said machine comprising a pair of elongated reels, spaced apart to receive the bird therebetween, and rotatable continuously about their longitudinal axes; a plurality of outwardly-extending, flexible fingers mounted on each reel respectively throughout the length thereof and spaced circumferentially therearound, the fingers being relatively heavy at one end of the reels, becoming gradually and progressively lighter as the opposite end of the reels is approached whereby the picking action thereof uniformly varies in step-by-step fashion and with decreasing force as said opposite end of the reels is approached; means mounting the reels with said axes thereof disposed at an angle to said path of travel of the bird whereby picking commences at one end of the bird as it enters between the reels and proceeds gradually and progressively to the opposite end of the bird as it advances along the reels; and means for varying the angularity between said axes of rotation of the reels.

5. In a fully automatic, multiple action machine for sequentially subjecting the various parts of a bird to a series of progressively changing modes of treatment in continuous, uninterrupted succession commensurate with varying degrees of resistance of the feathers thereof to picking, while the bird is advanced constantly along a predetermined path of travel, said machine comprising a pair of elongated reels, spaced apart to receive the bird therebetween, and rotatable continuously about their longitudinal axes; a plurality of outwardly-extending, flexible fingers mounted on each reel respectively throughout the length thereof and spaced circumferentially therearound, the fingers being relatively heavy at one end of the reels, becoming gradually and progressively lighter as the opposite end of the reels is approached whereby the picking action thereof uniformly varies in step-by-step fashion and with decreasing force as said opposite end of the reels is approached; means mounting the reels with said axes thereof disposed at an angle to said path of travel of the bird whereby picking commences at one end of the bird as it enters between the reels and proceeds gradually and progressively to the opposite end of the bird as it advances along the reels; and means for varying the distance between the reels.

6. In a fully automatic, multiple action machine for sequentially subjecting the various parts of a bird to a series of progressively changing modes of treatment in continuous, uninterrupted succession commensurate with varying degrees of resistance of the feathers thereof to picking, while the bird is advanced constantly along a predetermined path of travel, said machine comprising a pair of elongated reels, spaced apart to receive the bird therebetween, and rotatable continuously about their longitudinal axes; a plurality of outwardly-extending, flexible fingers mounted on each reel respectively throughout the length thereof and spaced circumferentially therearound, the fingers being arranged in groups, the fingers of the group proximal to one end of the reels being relatively heavy, the fingers of the other groups becoming gradually and progressively lighter as the opposite end of the reels is approached whereby the picking action thereof uniformly varies in step-by-step fashion and with decreasing force as said opposite end of the reels is approached; and means mounting the reels with said axes thereof disposed at an angle to said path of travel of the bird whereby picking commences at one end of the bird as it enters between the reels and proceeds gradually and progressively to the opposite end of the bird as it advances along the reels.

7. In a fully automatic, multiple action machine for sequentially subjecting the various parts of a bird to a series of progressively changing modes of treatment in continuous, uninterrupted succession commensurate with varying degrees of resistance of the feathers thereof to picking, while the bird is advanced constantly along a substantially horizontal path of travel, said machine comprising a pair of elongated reels, spaced apart to receive the bird therebetween, and rotatable continuously about their longitudinal axes; a plurality of outwardly-extending, flexible fingers mounted on each reel respectively throughout the length thereof and spaced circumferentially therearound, the fingers being relatively heavy at one end of the reels, becoming gradually and progressively lighter as the opposite end of the reels is approached whereby the picking action thereof uniformly varies in step-by-step fashion and with decreasing force as said opposite end of the reels is approached; and means mounting the reels with said axes thereof inclined at an angle to said path of travel of the bird whereby picking commences at one end of the bird as it enters between the reels and proceeds gradually and progressively to the opposite end of the bird as it advances along the reels.

8. In a fully automatic, multiple action machine for sequentially subjecting the various parts of a bird to a series of progressively changing modes of treatment in continuous, uninterrupted succession commensurate with varying degrees of resistance of the feathers thereof to picking, while the bird is advanced constantly along a substantially horizontal path of travel, said machine comprising a pair of elongated reels, spaced apart to receive the bird therebetween, and rotatable continuously about their longitudinal axes; a plurality of outwardly-extending, flexible fingers mounted on each reel respectively throughout the length thereof and spaced circumferentially therearound, the fingers being relatively heavy at one end of the reels, becoming gradually and progressively lighter as the opposite end of the reels is approached whereby the picking action thereof uniformly varies in step-by-step fashion and with decreasing force as said opposite end of the reels is approached; means mounting the reels with said axes thereof inclined at an angle to said path of travel of the bird whereby picking commences at one end of the bird as it enters between the reels and proceeds gradually and progressively to the opposite end of the bird as it advances along the reels; and means for raising and lowering the reels with respect to the bird.

9. In a fully automatic, multiple action machine for sequentially subjecting the various parts of a bird to a series of progressively changing modes of treatment in continuous, uninterrupted succession commensurate with varying degrees of resistance of the feathers thereof to picking, while the bird is advanced constantly along a predetermined path of travel, said machine comprising a pair of elongated reels, spaced part to receive the bird therebetween, and rotatable about their longitudinal axes; a plurality of outwardly-extending, flexible fingers of equal lengths mounted on each reel respectively throughout the length thereof and spaced circumferentially therearound, the fingers being relatively heavy at one end of the reels, becoming gradually and progressively lighter as the opposite end of the reels is approached whereby the picking action thereof uniformly varies in step-by-step fashion and with decreasing force as said opposite end of the reels is approached; means mounting the reels with said axes thereof disposed at an angle to said path of travel of the bird whereby picking commences at one end of the bird as it enters between the reels and proceeds gradually and progressively to the opposite end of the bird as it advances along the reels; and means coupled with said reels for rotating the same continuously and at substantially the same speed.

10. In a fully automatic, multiple action machine for sequentially subjecting the various parts of a bird to a series of progressively changing modes of treatment in continuous, uninterrupted succession commensurate with varying degrees of resistance of the feathers thereof to picking, while the bird is advanced constantly along a predetermined path of travel, said machine comprising a pair of elongated reels, spaced apart to receive the bird therebetween, and rotatable continuously about their longitudinal axes; a plurality of fingers mounted on each reel respectively throughout the length thereof and spaced circumferentially therearound, the fingers being relatively heavy at one end of the reels, becoming gradually and progressively lighter as the opposite end of the reels is approached whereby the picking action thereof uniformly varies in step-by-step fashion and with decreasing force as said opposite end of the reels is approached, said fingers being highly flexible whereby all of the fingers extend radially outwardly from the reels only during rotation of the latter; and means mounting the reels with said axes thereof disposed at an angle to said path of travel of the bird whereby picking commences at one end of the bird as it enters between the reels and proceeds gradually and progressively to the opposite end of the bird as it advances along the reels.

11. In a fully automatic, multiple action machine for sequentially subjecting the various parts of a bird to a series of progressively changing modes of treatment in continuous, uninterrupted succession commensurate with varying degrees of resistance of the feathers thereof to picking, while the bird is advanced constantly along a substantially horizontal path of travel, said machine comprising a pair of elongated reels, spaced apart to receive the bird therebetween, and rotatable continuously about their longitudinal axes; a plurality of outwardly-extending, flexible fingers mounted on each reel respectively throughout the length thereof and spaced circumferentially therearound, the fingers being relatively heavy at one end of the reels, becoming gradually and progressively lighter as the opposite end of the reels is approached whereby the picking action thereof uniformly varies in step-by-step fashion and with decreasing force as said opposite end of the reels is approached; and means mounting the reels with said axes thereof inclined at an angle to said path of travel of the bird whereby picking commences at one end of the bird as it enters between the reels at the lowermost end of the latter and proceeds gradually and progressively to the opposite end of the bird as it advances along the reels, said fingers being arranged in groups, the fingers of the group proximal to said lowermost end of the reels being the heaviest.

12. A poultry picking machine of the character described for apparatus wherein the bird being picked is continuously advanced along a straight path of travel, said machine comprising a pair of elongated reels spaced apart to receive the bird therebetween as it traverses said path; means for continuously rotating the reels about their longitudinal axes and in directions causing the proximal portions of their peripheries to travel in the same direction and at substantially right angles to the said path of travel; a plurality of normally radially disposed, flexible spaced apart fingers mounted on each reel respectively, the said fingers being relatively heavy at one end of the reels and becoming uninterruptedly lighter as the other ends of the reels are approached respectively; and means mounting the reels with their axes disposed at an angle to said path of travel of the bird being picked.

13. A poultry picking machine as set forth in claim 12 wherein the flexible fingers are arranged in a number of contiguous groups thereof, each group being composed of a number of fingers of like striking characteristics, the groups of fingers proximal to the ends of the reels first receiving the birds being picked being the heaviest in striking force, the groups of fingers as the opposite ends of the reels are approached being progressively lighter in striking force.

14. The poultry picking machine as set forth in claim 13 wherein groups of fingers of like striking force on the reels are in opposed relation and of substantially the same longitudinal extent.

References Cited in the file of this patent

UNITED STATES PATENTS

| | | |
|---|---|---|
| 2,422,608 | Albright | June 17, 1947 |
| 2,484,235 | Mead | Oct. 11, 1949 |
| 2,484,236 | Mead | Oct. 11, 1949 |
| 2,512,843 | Tomlinson | June 27, 1950 |
| 2,523,302 | Hunt | Sept. 26, 1950 |
| 2,560,524 | Johnson | July 10, 1951 |
| 2,635,284 | Hunt | Apr. 21, 1953 |
| 2,641,796 | Johnson | June 16, 1953 |
| 2,691,795 | Barker et al. | Oct. 19, 1954 |